(12) United States Patent
Usui

(10) Patent No.: US 6,338,004 B1
(45) Date of Patent: Jan. 8, 2002

(54) DISPLAY APPARATUS HAVING A TOUCH PANEL FOR AN INJECTION MOLDING MACHINE

(75) Inventor: Kazuo Usui, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 09/037,518

(22) Filed: Mar. 10, 1998

(30) Foreign Application Priority Data

Mar. 10, 1997 (JP) .............................. 9-054482

(51) Int. Cl.$^7$ .............................. B29C 45/00
(52) U.S. Cl. ................ 700/200; 700/180; 700/197; 345/700; 264/40.1; 425/144
(58) Field of Search ........................... 700/200, 17, 83, 700/197, 204, 205, 180; 425/139, 149, 144; 264/40.1; 345/676, 700, 10

(56) References Cited

U.S. PATENT DOCUMENTS

| | | | | | |
|---|---|---|---|---|---|
| 5,326,246 A | * | 7/1994 | Usui et al. | ................... | 425/145 |
| 5,340,297 A | * | 8/1994 | Takizawa | .................... | 425/145 |
| 5,470,218 A | * | 11/1995 | Hillman et al. | .............. | 425/144 |
| 5,552,995 A | * | 9/1996 | Sebastian | .................... | 700/97 |
| 5,795,511 A | * | 8/1998 | Kalantzis et al. | .......... | 264/40.6 |
| 5,911,924 A | * | 6/1999 | Siegrist et al. | ............. | 264/40.1 |
| 5,914,077 A | * | 6/1999 | Fujita | ........................ | 264/40.1 |
| 6,015,515 A | * | 1/2000 | Fujita | ........................ | 264/40.1 |
| 6,220,743 B1 | * | 4/2001 | Campestre et al. | ........... | 700/97 |

FOREIGN PATENT DOCUMENTS

JP         A-2103114         4/1990

\* cited by examiner

*Primary Examiner*—William Grant
*Assistant Examiner*—Ronald D Hartman, Jr.
(74) *Attorney, Agent, or Firm*—Birch, Stewart, Kolasch & Birch, LLP

(57) ABSTRACT

A display apparatus having a touch panel for an injection molding machine. The display apparatus has a main display mode for selectively displaying information relating to each function of the injection molding machine on an individual screen corresponding to the function. The touch panel enables input from the screen through touching. The display apparatus also has an auxiliary display. In the auxiliary display mode, a collective sub-screen is selectively displayed on any of the screens or on a specific one of the screens. The collective sub-screen contains a collection of specific display elements having something in common and selected from among display elements to be displayed on the screens. Thus, input operation is facilitated; various closely related data can be confirmed at a glance; and input forms or display forms are diversified.

5 Claims, 5 Drawing Sheets

DISPLAY APPARATUS HAVING A TOUCH PANEL FOR AN INJECTION MOLDING MACHINE

BACKGROUND OF THE INVENTION

1. Field of the Invention

The present invention relates to a display apparatus having a touch panel for an injection molding machine which has a main display mode for selectively displaying information relating to each function of the injection molding machine on an individual screen corresponding to the function and whose touch panel enables input from the screen through touching.

2. Description of the Related Art

Generally, an injection molding machine is equipped with a control unit, and a display apparatus having a touch panel accompanies the control unit.

Conventionally, there is known a display apparatus having a touch panel for an injection molding machine disclosed in Japanese Patent Application Laid-Open (kokai) No. 2 (1990)-103114. Normally, such a display apparatus having a touch panel has the function to selectively display information relating to each function of the injection molding machine on an individual screen corresponding to the function. The functions of an injection molding machine include a die-opening/metering function, an ejector function, and an injecting/metering function. Also, the touch panel enables input from the screen through touching.

However, the aforementioned conventional display apparatus having a touch panel involves the following problems.

First, since information relating to each function of an injection molding machine is displayed on an independent screen corresponding the function, a certain type of work may involve a frequent changeover of displayed screens in order to effect input from the screen through touching. For example, in a regular molding step, the ejector function is turned on. By contrast, in a setting step for setting molding conditions, the ejector function must be turned off, since set values must be adjusted while the state of resin filled in a die is monitored. In the setting step, if the ejector function is left on, an ejector pin will advance upon opening of the mold; consequently, a molded object will be ejected from the die. Accordingly, in this case, a user must change screens from a setting screen to an ejector function screen in order to turn off the ejector function, through touching a relevant touch key on the displayed ejector function screen. In this manner, the conventional display apparatus having a touch panel involves complication of operation, which hinders quick, smooth execution of work and is highly likely to cause operation errors.

Second, in an injection molding machine, functions are closely interrelated in terms of operational state; thus, when a certain function is active, it is quite important to accurately and quickly grasp the operational state of other functions. However, the conventional display apparatus having a touch panel fails to accurately and quickly provide the operational state of the entire injection molding machine, since information relating to each function is displayed on an independent screen corresponding to the function.

SUMMARY OF THE INVENTION

An object of the present invention is to provide a display apparatus having a touch panel for an injection molding machine capable of facilitating input operation, expediting work, and preventing occurrence of operation errors.

Another object of the present invention is to provide a display apparatus having a touch panel for an injection molding machine enabling a user to confirm various closely related operation data at a glance so as to accurately and quickly grasp the operational state of the entire injection molding machine.

A further object of the present invention is to provide a display apparatus having a touch panel for an injection molding machine which provides diversified input forms or display forms so as to improve its user friendliness.

To achieve the above objects, the present invention provides a display apparatus for an injection molding machine which has a touch panel for touch input. The display apparatus has a main display mode and an auxiliary display mode. In the main display mode, information relating to each function of the injection molding machine is selectively displayed on an individual screen corresponding to the function. In the auxiliary display mode, a collective sub-screen is selectively displayed on any of the screens or on a specific one of the screens. The collective sub-screen contains a collection of specific display elements having something in common and selected from among display elements to be displayed on the screens.

DETAILED DESCRIPTION OF THE PREFERRED EMBODIMENT

An embodiment of the present invention will now be described in detail with reference to the drawings. The accompanying drawings are illustrative of the embodiment and are not meant to limit the scope of the invention. To clarify the invention, the detailed description of known parts is omitted.

First, there is described with reference to FIGS. 7 and 8 the schematic configuration of a control unit to which a display apparatus 1 having a touch panel according to the present embodiment attaches, and of an injection molding machine on which the control unit is mounted.

Figure 7:
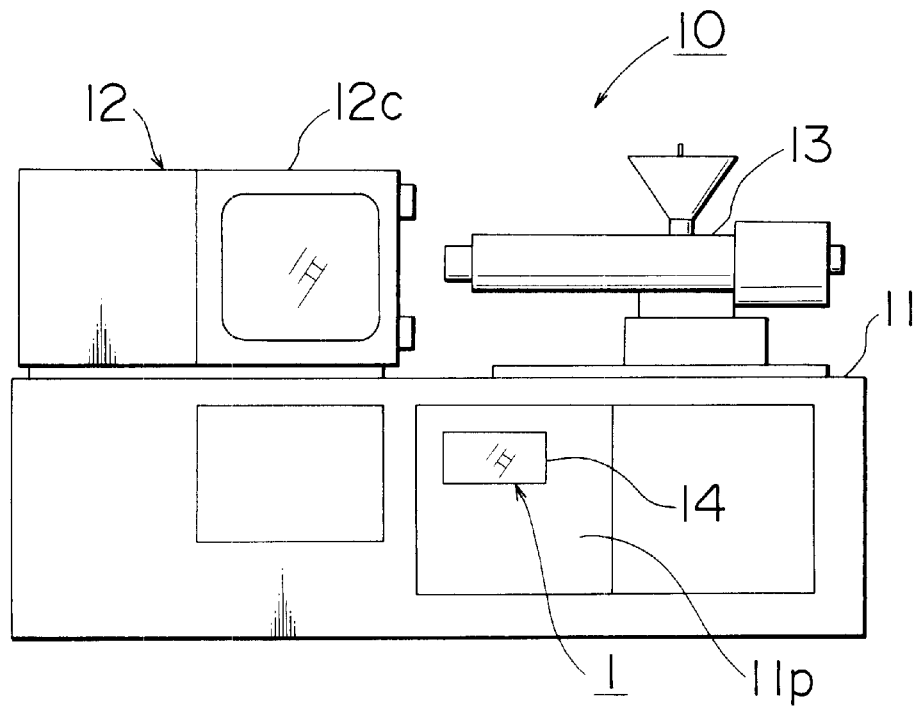
FIG. 7 is a schematic view showing an injection molding machine equipped with the display apparatus having a touch panel.

FIG. 7 shows an injection molding machine 10 equipped with the display apparatus 1 having a touch panel. The injection molding machine 10 includes a machine base 11, a die-clamping unit 12 located on the top surface of the machine base 11 at one end of the machine base 11 and covered with a protection cover 12c, and an injection unit 13 located on the top surface of the machine base 11 at the other end of the machine base 11. The machine base 11 contains a control unit 20, which will be described later, and includes a front panel 11p, on which a display 14 constituting the display apparatus 1 having a touch panel is disposed. The display 14 can be a CRT, a plasma display, a liquid crystal display, or the like.

Figure 8:
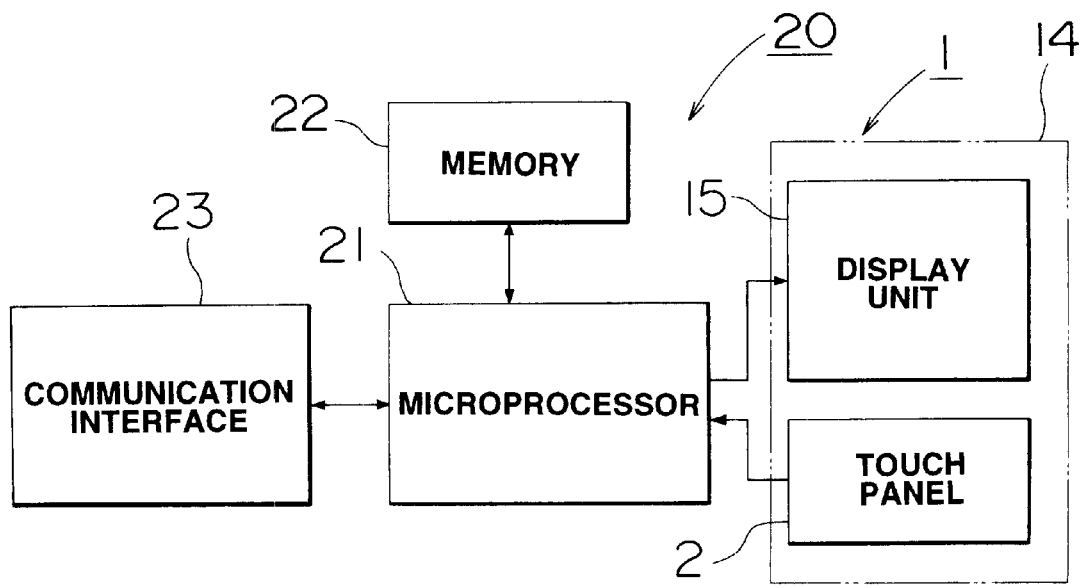
FIG. 8 is a block diagram showing a portion of a control unit mounted on the injection molding machine of FIG. 7, related to the display apparatus having a touch panel.

FIG. 8 shows a portion of the control unit 20 mounted on the injection molding machine 10, related to the display apparatus 1 having a touch panel. The control unit 20 includes a microprocessor 21 for performing various kinds of control of the injection molding machine 10. A display unit 15 is connected to the microprocessor 21. The microprocessor 21 has the function to display various screens A, B, C, . . . (FIGS. 1 to 6), on the display unit 15. The display unit 15 is equipped with a touch panel 2 enabling input from the screen through touching. The touch panel 2 is connected to the microprocessor 21. The display unit 15 and the touch panel 2 constitute the display 14.

Reference numeral 22 denotes a memory connected to the microprocessor 21. The memory 22 contains various data and a display control program for operating the display apparatus 1 having a touch panel. Reference numeral 23 denotes a communication interface for connection to an LAN system or the like.

The functions of the display apparatus 1 having a touch panel will now be described with reference to FIGS. 1 to 8.

The display apparatus 1 having a touch panel has a main display mode and an auxiliary display mode. In the main display mode, information relating to a selected function of the injection molding machine 10, such as a die-opening/closing function, an ejector function, an injection-and-metering function, or the like is displayed on an individual screen A, B, C, . . . corresponding to the function.

Figure 1:
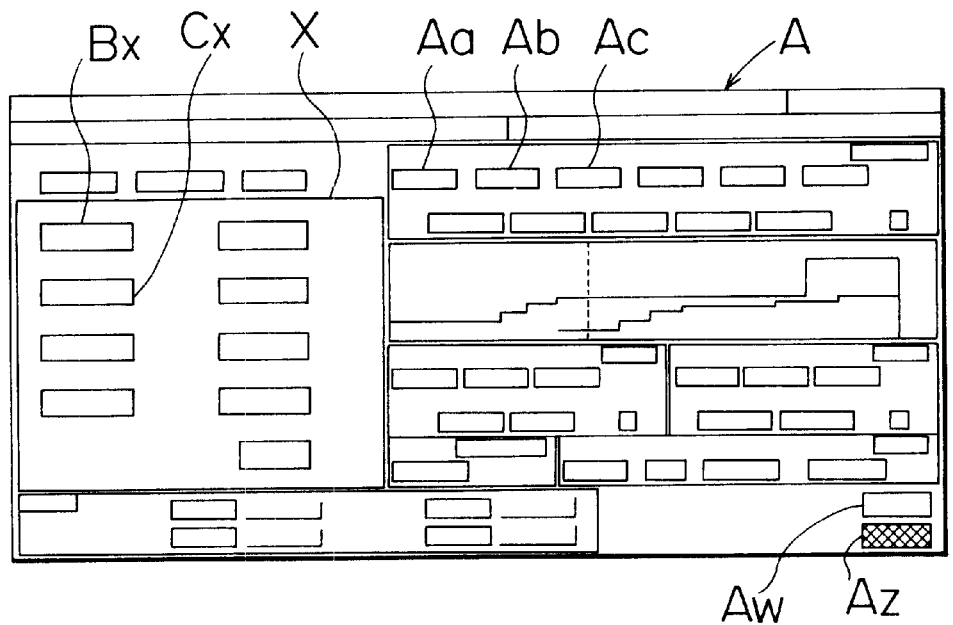
FIG. 1 is a view showing a screen displayed by a display apparatus having a touch panel according to an embodiment of the present invention.
Figure 5:
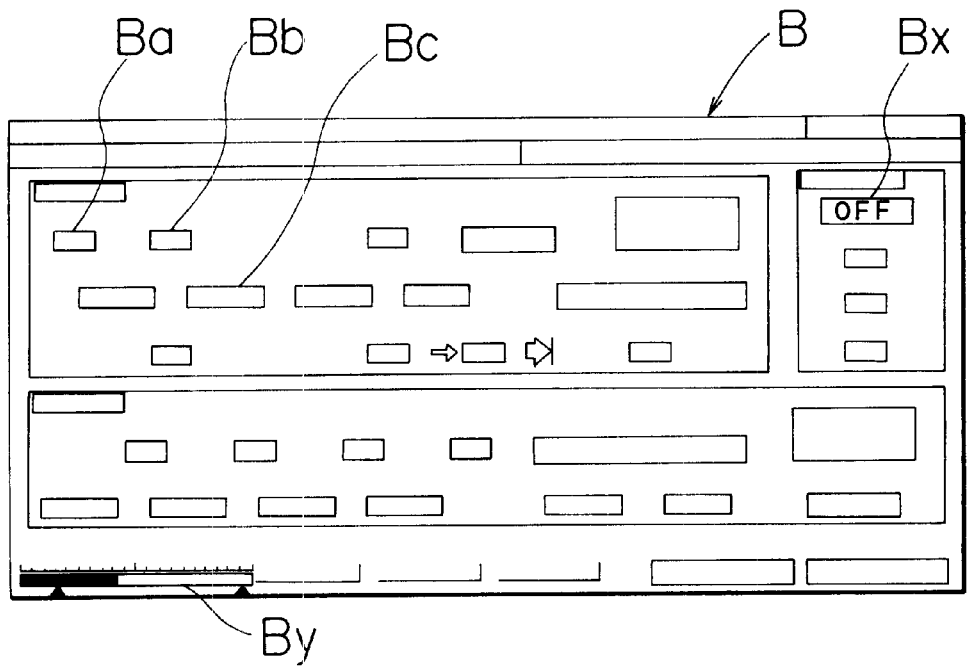
FIG. 5 is a view showing a further screen displayed by the display apparatus having a touch panel.
Figure 6:
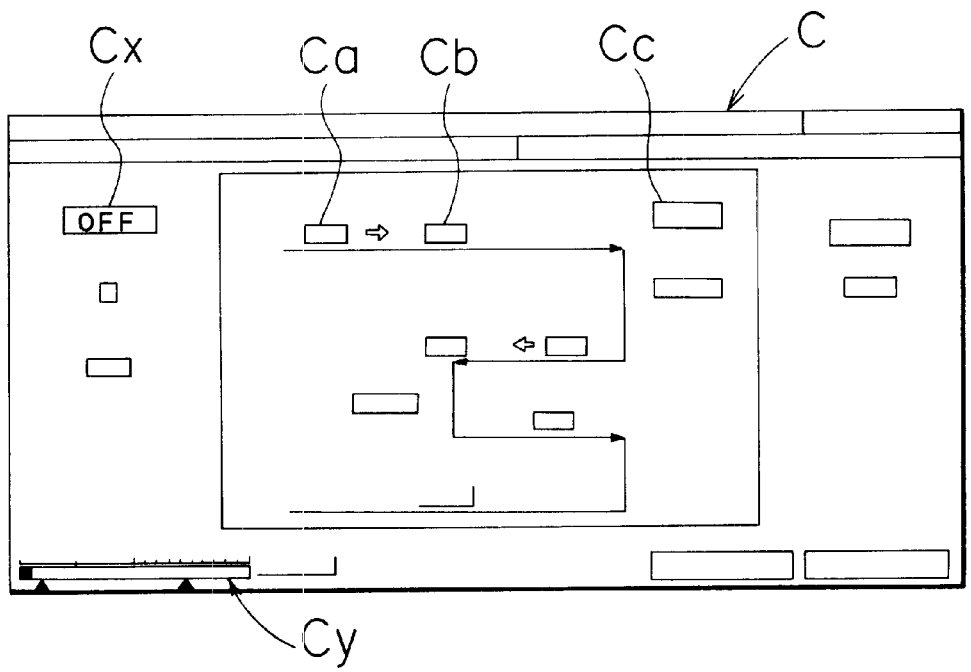
FIG. 6 is a view showing a still further screen displayed by the display apparatus having a touch panel.

For example, FIG. 1 (FIG. 3) shows screen A which displays information relating to main conditions of injection molding. The screen A displays a number of display elements Aa, Ab, Ac, . . . , which include the main conditions such as resin charge rate, holding pressure, pressure limit, metered values, speed-pressure changeover position, and temperature. FIG. 5 shows screen B which displays information relating to the die-opening/closing function. The screen B displays a number of display elements Ba, Bb, Bc, . . . , which include data such as speed and pressure at the time of die clamping and at the time of die opening, a touch key Bx for turning on or off operation at the time of die attachment, and die position data By indicative of die position. FIG. 6 shows screen C which displays information relating to the ejector function. The screen C displays a number of display elements Ca, Cb, Cc, . . . , which include data such as the ejection pressure of an ejector pin, ejection position, and ejection count, touch key Cx for turning on or off the ejector function, and ejector position data Cy indicative of the position of the ejector pin.

The auxiliary display mode has the function to selectively display a collective sub-screen X or Y on any of or a specific one of the screens A, B, C, . . . , either partially or fully. The collective sub-screen X or Y contains a collection of specific display elements having something in common and selected from among the display elements Aa, Ab, Ac, . . . , Ba, Bb, Bc, . . . , Ca, Cb, Cc, . . . , to be displayed on the screens A, B, C, . . .

Figure 2:
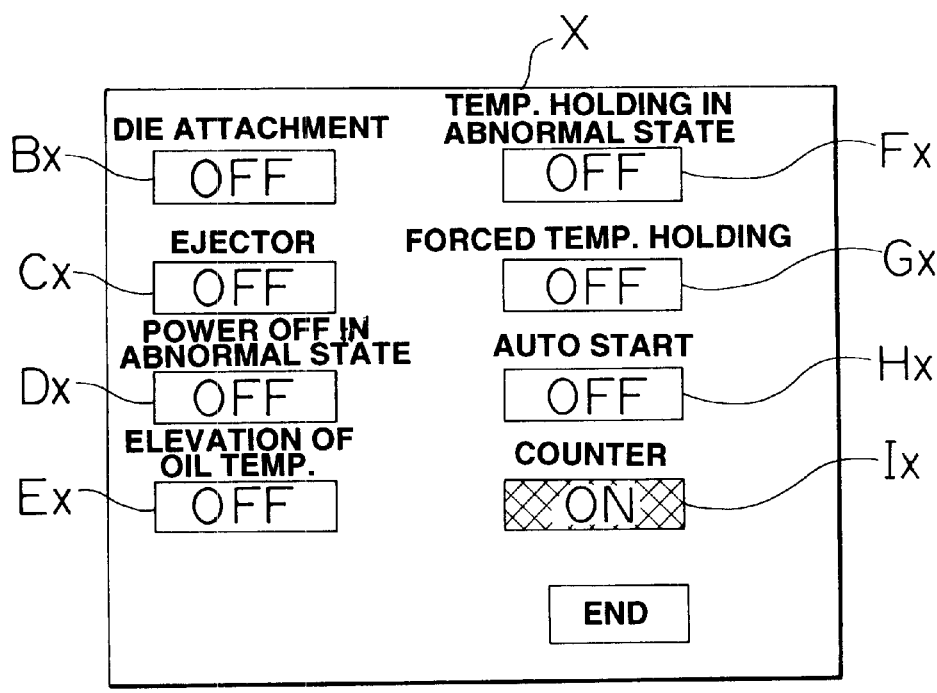
FIG. 2 is an enlarged view showing a collective sub-screen appearing on the screen of FIG. 1.

FIGS. 1 and 2 show a display example in which the screen A displays the collective sub-screen X in a left-hand area of the screen, which sub-screen X contains, as specific display elements having something in common, a touch key Bx for turning on or off a die-attachment function, a touch key Cx for turning on or off an ejector function, a touch key Dx for turning on or off an abnormal-state power-off function, a touch key Ex for turning on or off an oil-temperature elevation function, a touch key Fx for turning on or off an abnormal-state temperature-holding function, a touch key Gx for turning on or off a forced-temperature-holding function, a touch key Hx for turning on or off an automatic-start function, and a touch key Ix for turning on or off a counter function. In this case, part or all of the exemplified touch keys may be displayed as specific display elements on the collective sub-screen X. Accordingly, specific display elements to be displayed on the collective sub-screen X may be arbitrarily set in advance.

Thus, for example, in the step of setting molding conditions, when set molding conditions are to be adjusted while the state of a resin filled in a die is monitored, a user may touch a collective display key Az displayed on the screen A. As a result, the collective screen X shown in FIG. 2 will be displayed at the left of the screen A. By touching a relevant touch key, specifically the touch key Cx, displayed on the collective screen X, the ejector function can be turned off. Accordingly, the user does not need to change screens from the screen A for setting molding conditions to the screen C for the ejector function. Thus, even when any of or a specific one of the screens A, B, C, . . . , is displayed, the user can perform input operation from the collective sub-screen X displayed on the currently displayed screen A, B, . . . That is, the user does not need to change screens from any of or a specific one of the screens A, B, C, . . . , to another screen, whereby operation is facilitated, work is expedited, and occurrence of operation errors is prevented.

Figure 3:
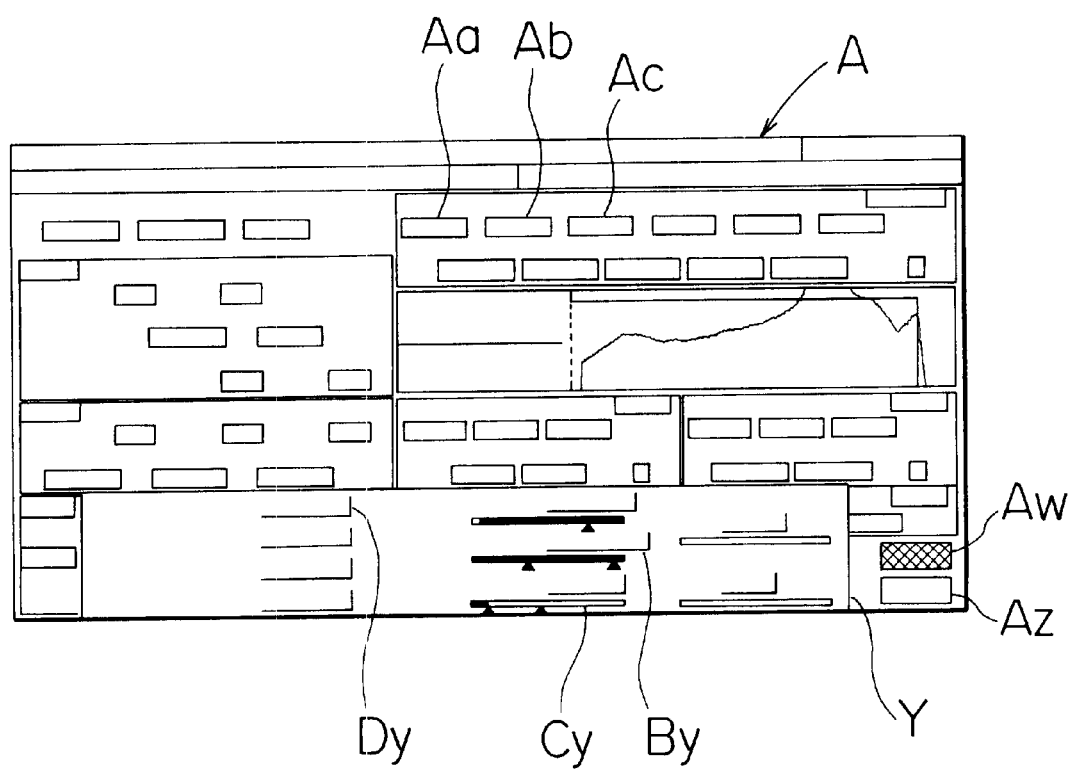
FIG. 3 is a view showing another screen displayed by the display apparatus having a touch panel.
Figure 4:
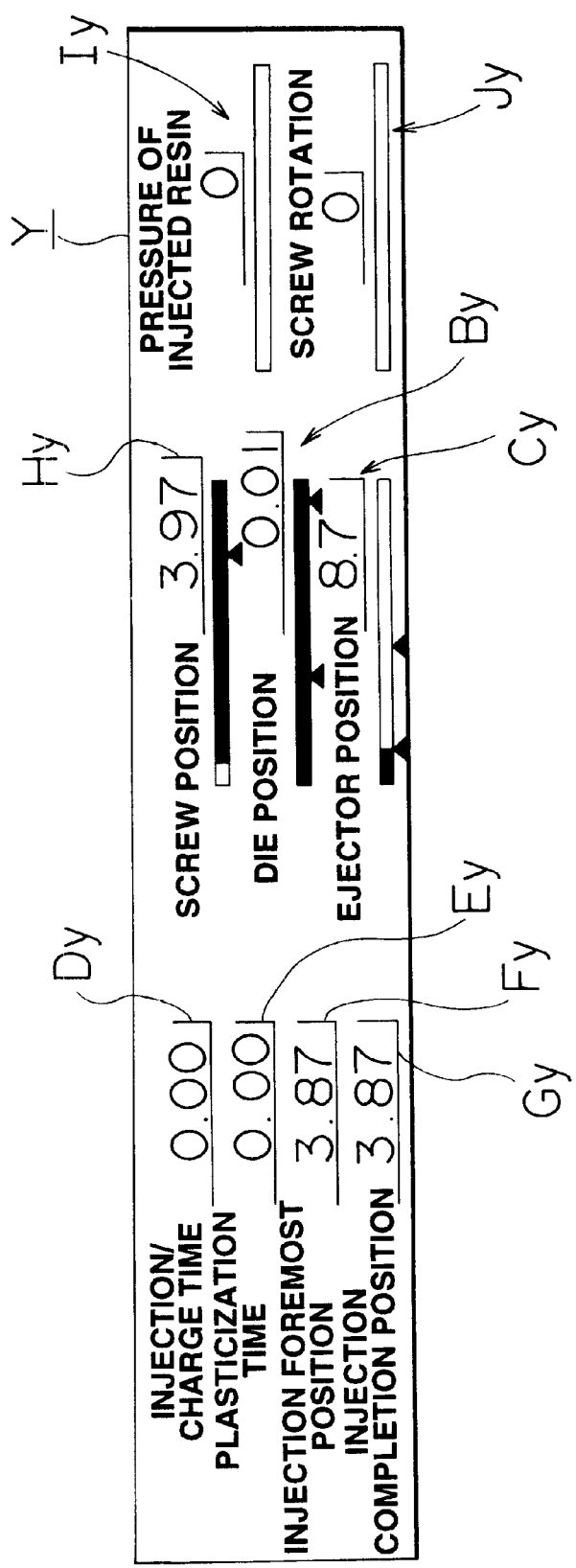
FIG. 4 is an enlarged view showing a collective sub-screen appearing on the screen of FIG. 3.

FIGS. 3 and 4 show a display example in which the screen A displays the collective sub-screen Y in a bottom area of the screen, which sub-screen Y contains, as specific display elements having something in common, operation data By, Cy, Dy, . . . relating to the injection molding machine 10, specifically die position By, ejector position Cy, injection/charge time Dy, plasticization time Ey, injection foremost position Fy, injection completion position Gy, screw position Hy, pressure of injected resin Iy, and screw rotational speed Jy. In this case, part or all of the exemplified data may be displayed as specific display elements on the collective sub-screen Y. Accordingly, specific display elements to be displayed on the collective sub-screen Y can be arbitrarily set in advance.

Thus, by touching a collective display key Aw displayed on the screen A, the collective sub-screen Y shown in FIG. 4 is displayed on the screen A at the bottom of the screen. Referring to the sub-screen Y, a user can confirm operation data By, Cy, Dy, . . . Accordingly, the user does not need to change screens. Thus, even when any of or a specific one of the screens A, B, C, . . . , is displayed, the user can confirm closely interrelated operation data By, Cy, Dy, . . . , at a glance and thus can grasp the operational state of the entire injection molding machine 10 accurately and quickly.

The display apparatus 1 having a touch panel described above enables a user to perform input operation through use of the touch keys Bx, Cx, Dx, . . . , or to confirm the operation data By, Cy, Dy, . . . , while detailed information displayed on each of the screens A, B, C, . . . , is monitored. Further, even when any of or a specific one of the screens A, B, C, . . . , is displayed, by displaying the collective sub-screen X or Y on the currently displayed screen A, B, C, . . . , the user can perform input operation through use of the touch keys Bx, Cx, Dx, . . . displayed on the collective sub-screen X, or can confirm the operation data By, Cy, Dy, ... displayed on the collective sub-screen Y. The improved user friendliness of the display apparatus 1 having a touch panel is attained by the thus-established diversification of input forms or display forms.

The present invention is not limited to the above-described embodiment. Regarding structural details, shape, layout, quantity, and the like, modifications and any omission or addition may be possible as needed without departing from the scope of the invention.

For example, the above embodiment is described while specific display elements having something in common are touch keys for turning on or off part or all of the functions of an injection molding machine, or the operation data of the injection molding machine. However, set data or the like may be employed as other specific display elements.

What is claimed is:

1. A display apparatus having a touch panel for an injection molding machine which has a main display mode for selectively displaying information relating to each function of the injection molding machine on an individual screen corresponding to the function and whose touch panel enables input from the screen through touching, wherein an auxiliary display mode is provided which enables a collective sub-screen to be selectively displayed on any of the individual screens corresponding to a respective function or on a specific one of the screens corresponding to a respective function, the collective sub-screen containing a collection of specific display elements having something in common and selected from among display elements to be displayed on the screens, the collective sub-screen being viewable simultaneously with the individual screen corresponding to a function upon which the collective sub-screen is displayed, wherein the functions include at least one of a die attachment function, an ejector function, an abnormal-state power-off function, an oil-temperature elevation function, an abnormal-state temperature-holding function, a forced-temperature-holding function, an automatic-start function, and a counter function.

2. A display apparatus having a touch panel for an injection molding machine according to claim 1, wherein the specific display elements are touch keys for turning on or off part or all of the functions.

3. A display apparatus having a touch panel for an injection molding machine according to claim 1, wherein the specific display elements are operation data relating to the injection molding machine.

4. A display apparatus having a touch panel for an injection molding machine according to claim 3, wherein the operation data include part or all of injection/charge time, plasticization time, injection foremost position, injection completion position, screw position, die position, ejector position, pressure of injected resin, and screw rotational speed.

5. A display apparatus having a touch panel for an injection molding machine according to claim 1, wherein the specific display elements to be displayed on the collective sub-screen can be arbitrarily selected.

* * * * *